DIGITALLY RESPONSIVE SERVO SYSTEMS INCLUDING A PHOTOELECTRIC QUANTIZER AND FAILSAFE CIRCUITRY THEREFOR
Filed Sept. 8, 1966 4 Sheets-Sheet 1
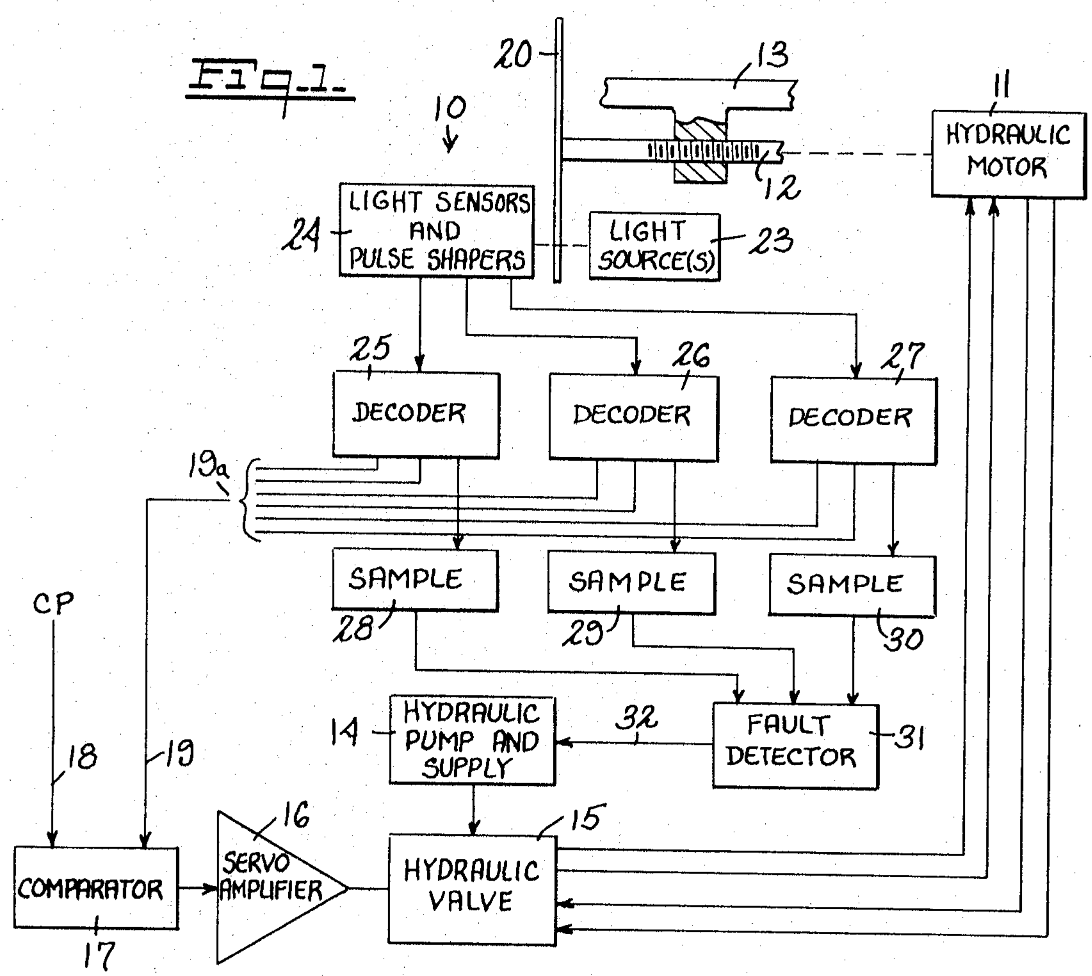
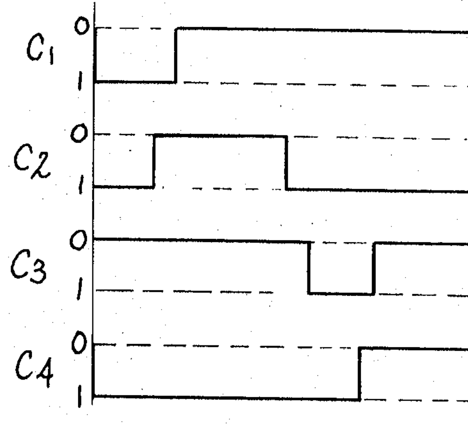
INVENTORS
Johann F. Reuteler
Robert F. Anderson
BY DeLio and Montgomery
ATTORNEYS INVENTOR
Johann F. Reuteler
Robert F. Anderson
BY
De Lio and Montgomery
ATTORNEYS

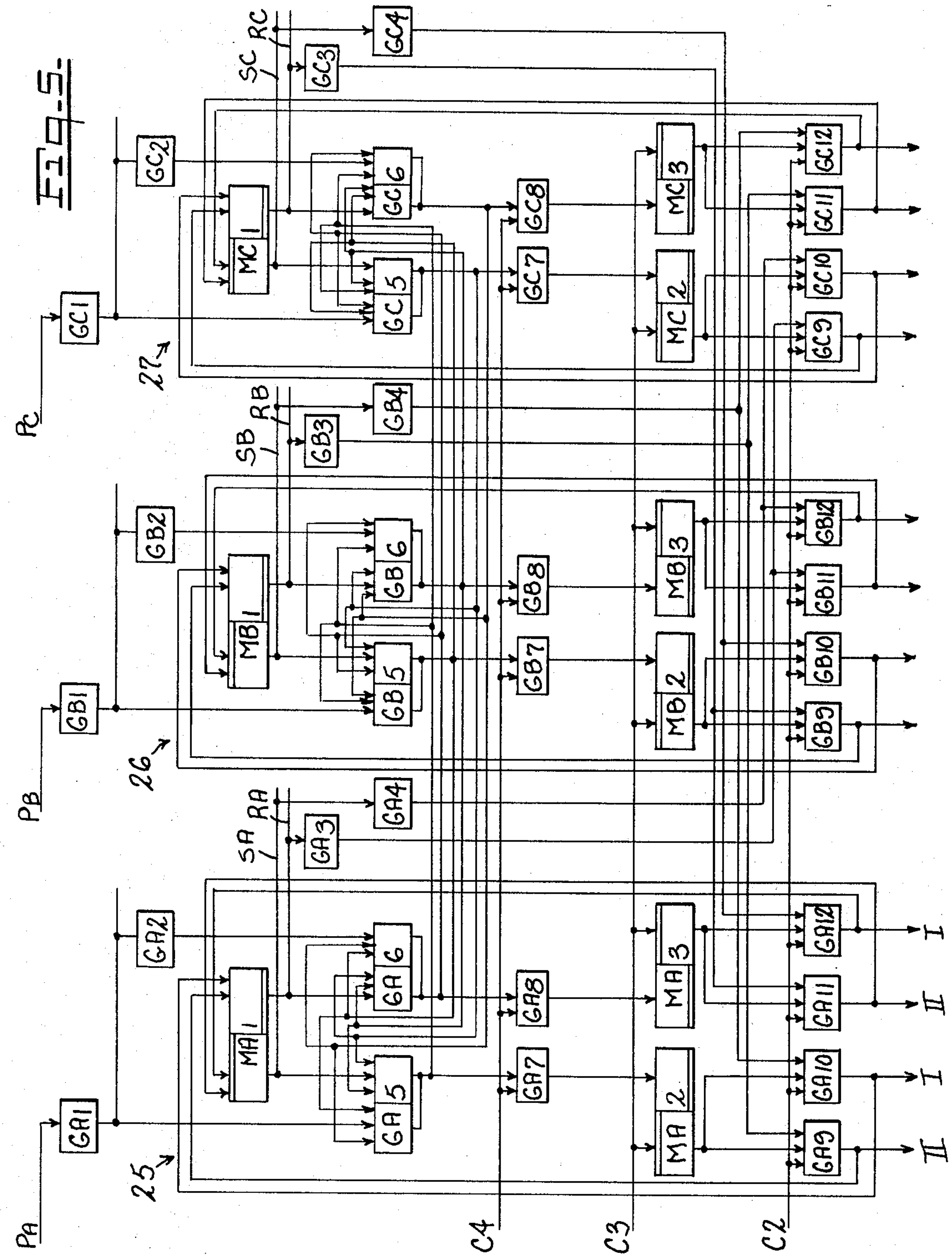
INVENTORS
Johann F. Reuteler
Robert F. Anderson
BY Dedio and Montgomery
ATTORNEYS DIGITALLY RESPONSIVE SERVO SYSTEMS INCLUDING A PHOTOELECTRIC QUANTIZER AND FAILSAFE CIRCUITRY THEREFOR Filed Sept. 8, 1966

INVENTORS
Johann F. Reuteler
Robert F. Anderson

BY De Lio and Montgomery
ATTORNEYS

United States Patent Office 3,536,979
Patented Oct. 27, 1970

1

3,536,979
DIGITALLY RESPONSIVE SERVO SYSTEMS INCLUDING A PHOTOELECTRIC QUANTIZER AND FAILSAFE CIRCUITRY THEREFOR

Johann F. Reuteler, Elmwood, and Robert F. Anderson, Simsbury, Conn., assignors to Pratt & Whitney Inc., West Hartford, Conn., a corporation of Delaware
Filed Sept. 8, 1966, Ser. No. 577,891
Int. Cl. G05b *9/02*
U.S. Cl. 318—563 6 Claims

ABSTRACT OF THE DISCLOSURE

This disclosure relates to a device for quantizing the movement of a movable member which moves in either direction along a linear path. Three rectangular waveforms are generated in response to movement of the member in such a phase relationship that normally the waveforms never simultaneously have the same voltage level. The relationship of these waveforms is detected to determine the direction of movement and the change in voltage levels indicates the degree of movement. Still further, the waveforms are monitored to determine that they never simultaneously have the same voltage level which would indicate a malfunction.

This invention relates to servo systems and more particularly relates to servo systems of the type wherein a part is moved a discrete distance in response to application of a pulse thereto which, in turn, is representative of a discrete distance of movement.

Pulse or digitally responsive servo systems of the type to which the present invention pertains are well known in the art and generally speaking comprise a comparison device which receives a command signal in the form of pulses each indicative of an increment of distance of movement of the controlled part. Also applied to this comparison means is a feedback signal in the form of pulses each indicative of a unit of actual movement of a controlled part. The difference between the command signal and the feedback signal is compared to determine the existing error between the commanded position and the actual position and the servo system is so constructed and arranged as to move the part until the error decreases to zero.

Inasmuch as such servo systems are responsive to the error between the input command and the movement or actual position command any failure in the feedback pulse generating system can be quite serious. For example, in machine tool applications, where metal removal is taking place under servo control, such as continuous path contour milling, or point-to-point milling, or even drilling and boring operations, a malfunction in the feedback pulse generator may result in scrapping of a substantially complete workpiece which has had many previous machining operations performed thereon. In servo systems for controls of this type it is particularly desirable to have some method of detecting failure or malfunction in the feedback pulse generating system.

The means for deriving generating feedback pulses may comprise a commutator-like device referred to as a quantizer which rotates with a drive means such as a lead screw. Such commutator-like device may take the form of a drum composed of alternating conducting and non-

2 conducting segments thereon which are engaged by a plurality of brushes, or may operate on a photoelectric principle in the form of a disc having alternating opaque and transparent radial segments which are rotated past a plurality of selectively positioned light sources. The alternating segments on this type of quantizer disc will alternately interrupt and permit transmission of light from the light sources to the photoelectric cells which sense rotation of the disc and, hence, movement of the part coupled to the lead screw.

In either type of arrangement the energy detected either by the brushes or by the photocells may be applied to a decoding or synchronizing circuit which determines the direction of rotation and provides pulses indicative of predetermined increments of movement. The quantizer may be arranged to operate on various principles, for example, intermittent interruption and transmission of various types of energy such as electric energy, light energy, magnettic energy or radio frequency energy. It is the alternate interruption and transmission of these pulses of energy and the relationship of a plurality of pulses to each other which determines both the magnitude of movement and the direction thereof with respect to a predetermined path.

It may readily be seen in such types of servo systems that any failure of the feedback pulse generating system and malfunction therein will lead to inaccuracies in the servo system with results which may be very serious from the standpoint of money and time as exemplified by the aforementioned machine tool applications.

By way of example, in the case of the photoelectric type quantizer, potential problems are presented by failure of any of the photocells, light sources, or other electrical contacts, together with loosening of a lamp filament due to vibration, an open circuit in the power lines to the light sources or photosensitive devices, or even accumulation of dirt or dust which would mask transmission of light to a light sensing device. In controls of this type it is highly desirable to have some of detecting such failures in the feedback pulse generating system.

Accordingly, the present invention provides a new and improved position or movement quantizing device which is so constructed and arranged as to immediately determine if there has been an error or malfunction in the feedback pulse generating system and which may further be so arranged that upon detection of such error the machine drive system is immediately shut down to prevent error in the movement of the servo control parts and possible irreparable damage.

Briefly stated, the invention in one form thereof comprises the provision of a quantizer disc of one of the types previously explained which has alternate energy transmitting and non-transmitting sections with energy transmitting and receiving means disposed on opposite sides of the disc so that energy is alternately transmitted to or blocked from a plurality of energy receiving means as the disc is rotated. The energy receiving means are so related in position that waveforms are produced by the received energy which have a predetermined relationship such that the same condition never occurs simultaneously in all waveforms during proper operation. Means are further provided to detect the simultaneous existence of the parameter if a fault or malfunction should occur in the feedback pulse generator. In a specific embodiment of the invention, as hereinafter disclosed, the energy transmitted is light energy and the energy receiving means are so arranged as to produce a plurality of rectangular waveforms having phases so related that the voltage level of the waveforms are never simultaneously similar. More specifically, three waveforms each having first and second voltage levels are produced. This gives a possibility of eight combinations. Six of these combinations are utiliezd to provide incremental movement intelligence and rate intelligence while two of these combinations are utilized to indicate error or malfunction upon occurrence thereof.

An object of this invention is to provide a new and improved servo system feedback pulse generator.

Another object of this invention is to provide a new and improved positional quantizing device which is self-checking.

Another object of this invention is to provide a new and improved quantizing system of the type described which generates a plurality of waveforms having a common parameter which upon simultaneous occurrences thereof indicates a fault in the pulse generating system.

A further object of this invention is to provide a new and improved pulse generating system for indicating the position of a controlled movable object which utilizes photoelectric energy to indicate incremental movement of the object, rate of movement of the object and is self-checking against failure or malfunction.

The features of the invention which are believed to be novel are set forth with particularity and distinctly claimed in the concluding portion of this specification. The invention, however, both as to its operation and organization, together with further objects and advantages thereof may best be appreciated by reference to the following detailed description taken in conjunction with the drawings, in which:

FIG. 1 is a network illustrated in block form showing the servo system embodying the invention;

Figure 4:
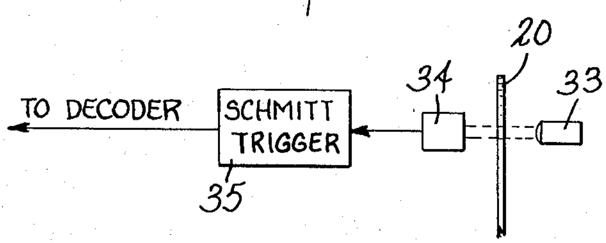
Figure 8:
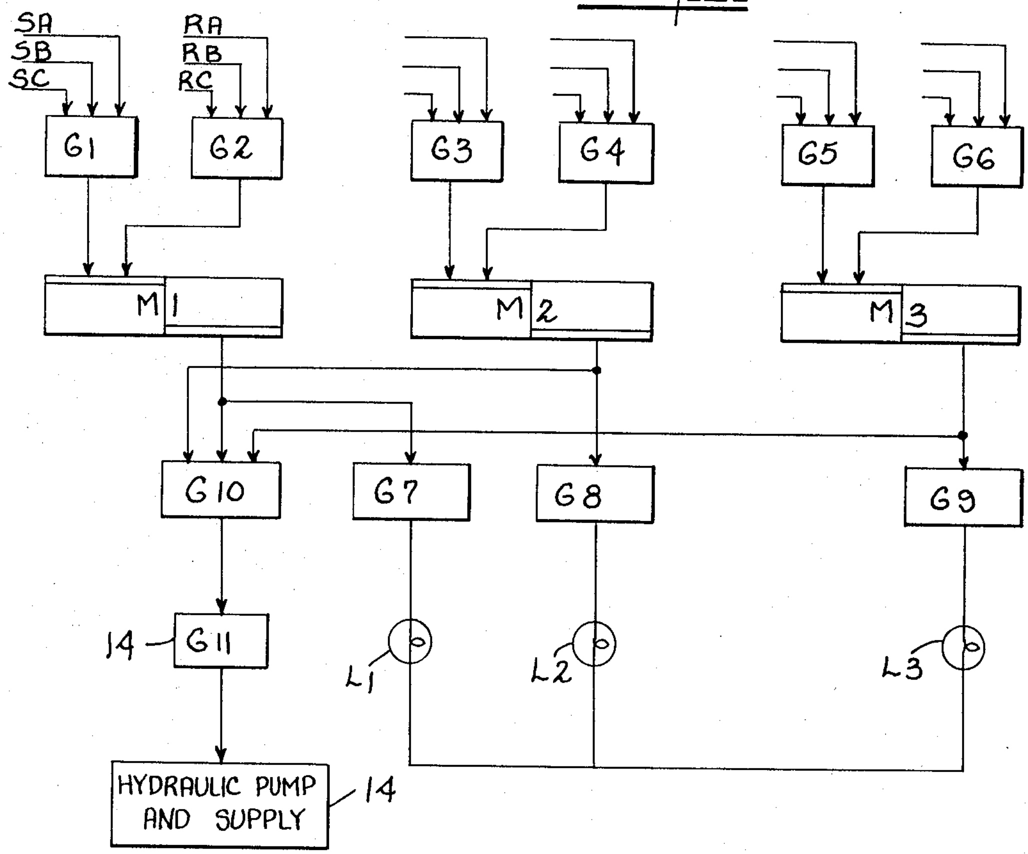
Figure 7A:
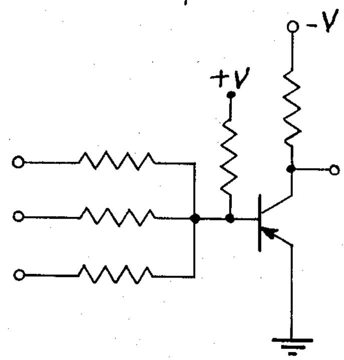
Figure 7B:
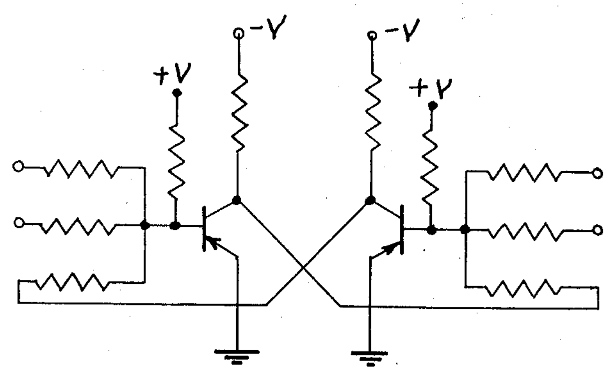

FIG. 4 diagrammatically exemplifies a network for converting light pulses to rectangular electrical waves;

FIG. 5 is a schematic diagram of the synchronizing or decoding networks shown in block form in FIG. 1;

FIG. 6 is a diagram of waveforms showing synchronizing or clock pulses which occur during one clock cycle;

FIGS. 7A and 7B are schematic diagrams of circuit elements utilized in the network of FIGS. 5 and 8; and FIG. 8 is a schematic diagram of sampling and fault-detecting networks shown in block form in FIG. 1.

FIG. 1 illustrates in block form a system 10 in which the invention may be embodied. This system may be part of an overall plural axis system designed to coordinate movement of separate movable parts, such as the tables and tools of a milling machine, etc. However, the invention may be disclosed through explanation of its application to only one axis of control. System 10 is illustrated as a hydraulically-actuated system. However, it will be understood that the drive portion of the system may be of other suitable operative means, such as electrical. The system 10 comprises a hydraulic motor 11 coupled to a lead screw 12 which moves thereon a machine tool part, such as table 13. Motor 11 receives fluid from a hydraulic pump and fluid supply 14 through a hydraulic valve 15 controlled by a servo amplifier 16. Servo amplifier 16 receives a positional error or proportional error signal from a device such as comparator 17 which may include, for example, a bi-directional counter which receives command pulses CP from the interpolation system of a numerical control system (not shown) over a line 18. The comparator device also receives feedback pulses, as will hereinafter be described, over a line 19. Rotatable with lead screw 12 is a quantizer disc 20 which as more clearly shown in FIG. 2 has equal radially extending segments or sections 21 and 22 which are alternately opaque and transparent. As quantizer disc 20 is rotated, the sections alternately transmit and interrupt transmission of light from sources 23 to light sensors 24. The light sensors which may be photoelectric cells A, B, and C, as exemplified in FIG. 2, generate a generally sinusoidal or trapezoidal waveform in response to the light alternately incident and non-incident thereon, which waveform is applied to pulse shaping circuits which may be of the well-known Schmitt trigger type. The Schmitt trigger circuits generate a rectangular pulse when the voltage applied thereto reaches and exceeds a predetermined magnitude. Thus the pulse shaping circuits convert a generally sinusoidal or trapezoidal waveform to a rectangular waveform. This rectangular waveform from the pulse shaping circuits is applied to decoders 25, 26 and 27 which have a function of generating feedback pulses each indicative of a predetermined angular movement of lead screw 12. These feedback pulses are then applied over lines *19a* and 19 to the comparator 17. The application of these feedback pulses to the comparator 17, in essence, tells the servo system the actual extent of movement of part 13 on lead screw 12.

The error intelligence contained in comparator 17 may be a pulse count, voltage magnitude, voltage phase difference, etc. which indicates the existing error between the movement commanded by the application of pulses over line 18 and the actual movement of part 13. In response to the existence of this error, servo amplifier 16 controls hydraulic valve 15 to continue movement of lead screw 12 and member 13 until the error is reduced to zero.

Further in accordance with the invention the contents of the decoders 25–27 are continuously sampled by sample networks 28, 29 and 30 to determine the existence of an invalid condition. If the sampling networks 28–30 sense an invalid condition as determined by fault-detector 31, fault-detector 31 may apply a signal over a line 32 to shut down the supply of hydraulic fluid to valve 15 and, hence, interrupt operation of motor 11 until the fault can be corrected.

It is to be understood that the system shown in FIG. 1 may be only a portion of a control system for a device such as a machine tool, there being a system 10 for each axis of control of the machine tool. For example, in a three-axes milling machine there would be three systems such as shown in FIG. 1, one for each axis of movement.

Figure 2:
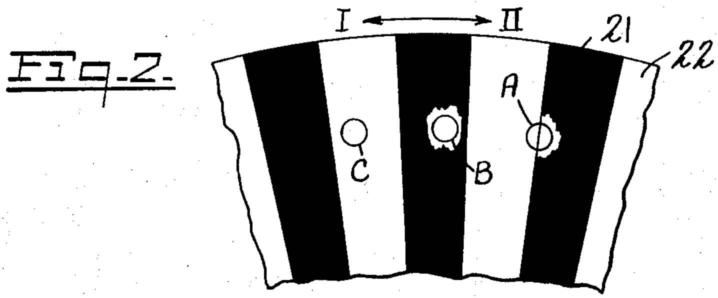
FIG. 2 is a section of a quantizer disc and the relation of energy receiving means thereto which may be utilized in a system embodying the invention.

Reference is now made to FIG. 2 which shows a segment of disc 20 having the aforesaid alternate transparent and opaque radially extending sections 22 and 21, respectively.

As the disc 20 is rotated, each segment will pass photocells or other photosensitive devices A, B and C when rotated in the direction of arrow I and pass photocells C, B and A in that order when rotated in the direction of arrow II.

The relation of disc 20, a light source 33, a photocell 34 and a Schmitt trigger circuit 35 is exemplified in FIG. 4.

Figure 3A:
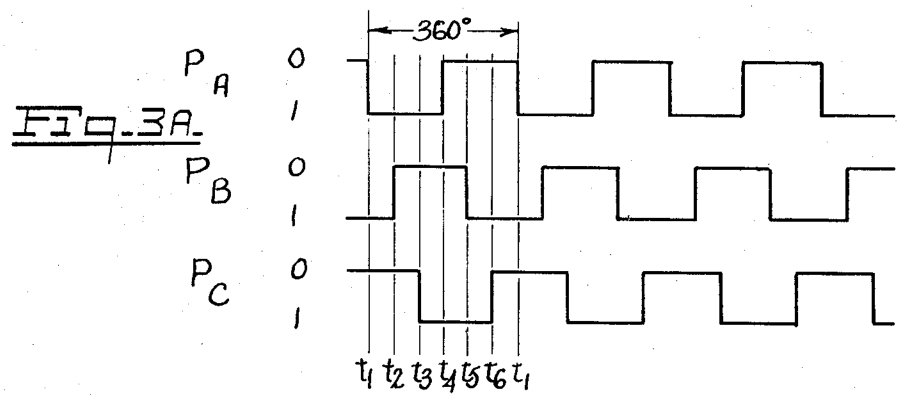
FIGS. 3A and 3B illustrate waveforms generated upon movement of the quantizer disc of FIG. 2.
Figure 3B:
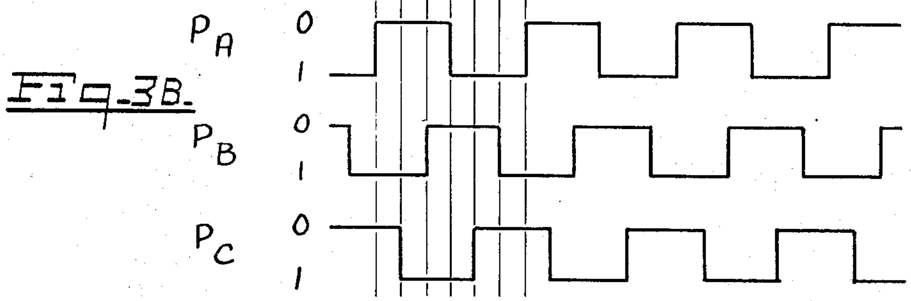

The diagram of FIGS. 3A and 3B represent the voltage outputs of $P_A$, $P_B$, and $P_C$ of the trigger circuits associated with each of photocells A, B and C. As represented in FIG. 4, the zero, "0," voltage level indicates the time at which a photocell has light incident thereon through a transparent segment while the one, "1," level indicates that light transmission to a photocell is blocked by an opaque segment. The photocells are so positioned with respect to the segments of disc 20 that the waveforms generated by such positioning never simultaneously have the same voltage level. In the illustrated embodiment, the photocells and, hence, the waveforms are 120 degrees out of phase with respect to each other, one cycle of a wave being considered 360 degrees, which corresponds to two adjacent segments 20 and 21 passing a photocell. In this respect it may be seen that wave $P_C$ leads wave $P_B$ by 120 degrees and, similarly, wave $P_B$ leads wave $P_A$ by 120 degrees (electrical degrees). This relationship is achieved by spacing the photocells and associated light sources 120 degrees with respect to each other and with regard to each pair of adjacent sections (each pair of adjacent sections determining 360 degrees).

In observing the waveforms of FIGS. 3A and 3B it will be noted that at no time do any of the waveforms due to photocells A, B or C have the same voltage level simultaneously.

With reference to FIG. 3A, it will be noted that following the included times the waveforms $P_A$, $P_B$, and $P_C$ have the following values:

| | $P_A$ | $P_B$ | $P_C$ |
|---|---|---|---|
| $t_1$ | 1 | 1 | 0 |
| $t_2$ | 1 | 0 | 0 |
| $t_3$ | 1 | 0 | 1 |
| $t_4$ | 0 | 0 | 1 |
| $t_5$ | 0 | 1 | 1 |
| $t_6$ | 0 | 1 | 0 |

and in FIG. 3B

| | $P_A$ | $P_B$ | $P_C$ |
|---|---|---|---|
| $t_1$ | 0 | 1 | 0 |
| $t_2$ | 0 | 1 | 1 |
| $t_3$ | 0 | 0 | 1 |
| $t_4$ | 1 | 0 | 1 |
| $t_5$ | 1 | 0 | 0 |
| $t_6$ | 1 | 1 | 0 |

At no time do the waveforms $P_A$, $P_B$, and $P_C$ have the same value of voltage level. Only six of the possible eight combinations of the various values of voltage level of the waveforms are utilized to indicate direction and rate of movement of the controlled part.

As will hereinafter be explained, if for any reason any of waveforms $P_A$, $P_B$, or $P_C$ should simultaneously have the same voltage level an invalid condition is detected and suitable action is initiated to shut down the servo system to prevent any damage due to the part being operated upon.

The photocells A, B and C may be spaced at any angular position about the disc 20 so long as they are equi-angular with respect to each other to produce the desired phase difference in the output waveforms $P_A$, $P_B$, and $P_C$. As shown in FIG. 2 the photocells are spaced one and two-thirds segments apart to effect the 120 degree phase relationship. However, they could be spaced two-thirds of a segment apart or two and two-thirds, three and two-thirds, four and two-thirds, etc., the prime consideration being that they are so spaced that the waves bear the same phase relation to each other, and the waves $P_A$, $P_B$, and $P_C$ never simultaneously have the same voltage level.

From the waveforms $P_A$, $P_B$, and $P_C$ are derived feedback pulses which are indicative of both the rate and direction of movement of the controlled part. As will hereinafter be made apparent, each change in voltage level of each waveform will produce a feedback pulse. It is to be understood that the duration of the waveforms at a given voltage level will depend on the rate of movement of the controlled part.

Reference is now made to FIG. 5 which illustrates in schematic and diagrammatic form of the decoders 25, 26 and 27 of FIG. 1. Each of the decoders 25, 26 and 27 receives as an input one of waves $P_A$, $P_B$, and $P_C$ as illustrated in FIG. 3A or 3B. For purposes of illustration, the operation of the decoders of FIG. 5 will be described with reference to the waveforms of FIG. 3*a*. The operation of the decoder networks is under the control of various clock or synchronizing signals C2, C3 and C4 (FIG. 6) having waveforms varying between a maximum and minimum value designated as "0" and "1," respectively, as illustrated in FIG. 6. These clock waveforms are derived from a clock generator of the type disclosed in the copending application of Johann Reuteler, Ser. No. 349,-216, filed Mar. 4, 1964.

Each of decoders 25, 26 and 27 is similar in construction and is cross-coupled, as will hereinafter be explained.

The decoder network will yield an output pulse for each change in the voltage level of waves $P_A$, $P_B$ and $P_C$ and thereby generate a pulse for a given increment of movement of table 13. Each decoder as exemplified by decoder 25 as illustrated is constructed from so-called NOR logic circuitry using elements such as transistors which will provide a "0" level output when there is a "1" level input, and will provide a "1" level output when there is "0" or no input. Such NOR circuits may be used as gates, inverters or amplifiers, as shown in FIG. 7A and may also be cross-connected to form bi-stable multi-vibrators or flip-flops as shown in FIG. 7B, which are hereinafter called memories. Referring now to decoder 25, this decoder comprises an amplifier and inverter GA1 which receives a rectangular wave input from its associated pulse shaping circuit. The output of amplifier GA1 is also applied to an inverter GA2. The outputs of inverters GA1 and GA2 are applied to coincidence gates GA5 and GA6, respectively, which have a "1" output when all of the inputs thereto are "0." The outputs of gates GA5 and GA6 are applied to coincidence gates GA7 and GA8 and if these inputs are "0" at pulse C4 these gates will apply resetting signals to memories MA2 and MA3, respectively. Memories MA2 and MA3 are set every clock cycle by pulse C3. The outputs of memories MA2 and MA3 are applied to coincidence gates GA9, GA10, GA11 and GA12 which may apply position or movement feedback pulses to comparator 17. The outputs of these gates are sampled by memory MA1 which has a function of the storing of information of the condition of inverter GA1. Memory MA1 is set or reset by one of gates GA9–GA12 to a condition indicative of the voltage level of wave $P_A$.

All of decoders 25, 26 and 27 are individually similar in construction and are cross-coupled, as will hereinafter be explained, to provide the necesary logic.

If rotation of the quantizer disc 20 is in such a direction as to indicate a first or positive direction of movement of table 13, pulse outputs will be obtained at clock time C2 from gates GA10 and GA12. If the rotation of disc 20 is in such a direction as to indicate an opposite or negative direction of travel, then outputs may be attained at clock time C2 from gates GA9 and GA11.

Pulse train $P_A$ is applied directly to inverter GA1 and through inversion by gate GA1 to inversion gate GA2. Memory MA1 assumes a state dependent upon the voltage level of the waveform $P_A$ and is set by an output pulse from Gate GA11 or GA12 and reset by an output pulse from gate GA9 or GA10. Gates GA5 and GA6 receive inputs from gates GA1 and GA2, respectively, and also from opposite sides of memory MA1, respectively. Gates GA5 and GA6 will detect any discrepancy between the instantaneous state of the waveform $P_A$ and the condition of memory MA1. If a discrepancy is detected, a signal disables one of gates GA7 or GA8 (the signal is from gates GA5 or GA6) and the outputs thereof will not reset either of memories MA2 or MA3 which are set by clock pulse C3. Subsequently, gates GA9, GA10, GA11 or GA12 sense the discrepancy as stated by a set condition of memory MA2 or MA3, and also memories MB1 and MC1 from decoders 26 and 27 to determine when the direction of rotation is positive or negative. When this determination is made, one of gates GA9–GA12 will produce a feedback pulse.

An output from either of gates GA11 or GA12 will set memory MA1. An output pulse from gate GA9 or GA10 will reset memory MA1. If reset, the discrepancy between memory MA1 and the level of waveform $P_A$ is removed, until the level of signal A changes again. In response to such change memory MA2 or MA3 will be set to enable or inhibit a selected one of gates GA9–GA12.

Turning now to FIGS. 3A and 3B, it will be noted that there are six changes of condition when any two adjacent segments of the quantizer disc pass any one of photocells A, B or C. It will be noted that at no time do such waves all have the same voltage value. As will hereinafter be explained, detection means are provided to sense if, due to some fault, all waves $P_A$, $P_B$, and $P_C$ should simultaneously have the same value. If such an illegal condition existed it would signify that the incremental movement of the part to which a disc was coupled was not correctly being counted, and fed back to comparator 17. Such an illegal condition is sensed by all of memories MA1, MB1 and MC1 being set or reset at the same time, as will hereinafter be explained.

By reference to FIGS. 3A and 3B it will be seen that for different directions of rotation the various relative conditions of the waves $P_A$, $P_B$, and $P_C$ are reversed. In response to these six conditions, one of gates GA9–GA12, GB9–GB12 and GC9–GC12 are selectively enabled at time $t_2$ to provide either a positive direction-indicating or a negative direction-indicating pulse. The operation of the decoders may best be understood by reference to the following table in conjunction with FIGS. 3A and 3B. The table sets forth the condition of the elements of the decoders at and immediately after the time shown in FIGS. 3A, and 3B. In the table, the zeros "0" refer to the zero voltage output and the ones "1" refer to a negative voltage level output, and R denotes a reset condition of a memory while S denotes a set condition of a memory. The condition of memories MA1, MB1 and MC1 is representative of the levels of the waveforms $P_A$, $P_B$, and $P_C$ immediately following the indicated times. Memories MA1, MB1 and MC1 are set by a "1" input into their right sides. Memories MA2, MB2 and MC2 are set by an input into their left sides and memories MA3, MB3 and MC3 are set by an input into their right sides.

| | $t_1$ | $t_2$ | $t_3$ | $t_4$ | $t_5$ | $t_6$ |
|---|---|---|---|---|---|---|
| A | 1 | 1 | 1 | 0 | 0 | 0 |
| B | 1 | 0 | 0 | 0 | 1 | 1 |
| C | 0 | 0 | 1 | 1 | 1 | 0 |
| MA1 | R | R | R | S | S | S |
| MB1 | R | S | S | S | R | R |
| MC1 | S | S | R | R | R | S |
| GA1 | 0 | 0 | 0 | 1 | 1 | 1 |
| GA2 | 1 | 1 | 1 | 0 | 0 | 0 |
| GB1 | 0 | 1 | 1 | 1 | 0 | 0 |
| GB2 | 1 | 0 | 0 | 0 | 1 | 1 |
| GC1 | 1 | 1 | 0 | 0 | 0 | 1 |
| GC2 | 0 | 0 | 1 | 1 | 1 | 0 |
| GA3 | 1 | 1 | 1 | 0 | 0 | 0 |
| GA4 | 0 | 0 | 0 | 1 | 1 | 1 |
| GB3 | 1 | 0 | 0 | 0 | 1 | 1 |
| GB4 | 0 | 1 | 1 | 1 | 0 | 0 |
| GC3 | 0 | 0 | 1 | 1 | 1 | 0 |
| GC4 | 1 | 1 | 0 | 0 | 0 | 1 |
| GA5 | 1 | 0 | 0 | 0 | 0 | 0 |
| GA6 | 0 | 0 | 0 | 1 | 0 | 0 |
| GB5 | 0 | 0 | 0 | 0 | 1 | 0 |
| GB6 | 0 | 1 | 0 | 0 | 0 | 0 |
| GC5 | 0 | 0 | 1 | 0 | 0 | 0 |
| GC6 | 0 | 0 | 0 | 0 | 0 | 1 |
| GA7 | 0 | 1 | 1 | 1 | 1 | 1 |
| Gx8 | 1 | 1 | 1 | 0 | 1 | 1 |
| GB7 | 1 | 1 | 1 | 1 | 0 | 1 |
| GB8 | 1 | 0 | 1 | 1 | 1 | 1 |
| GC7 | 1 | 1 | 0 | 1 | 1 | 1 |
| GC8 | 1 | 1 | 1 | 1 | 1 | 0 |
| MA2 | S | R | R | R | R | R |
| MA3 | R | R | R | S | R | R |
| MB2 | R | R | R | R | S | R |
| MB3 | R | S | R | R | R | R |
| MC2 | R | R | S | R | R | R |
| MC3 | R | R | R | R | R | S |
| GA9 | 0 | 0 | 0 | 0 | 0 | 0 |
| GA10 | 1 | 0 | 0 | 0 | 0 | 0 |
| GA11 | 0 | 0 | 0 | 0 | 0 | 0 |
| GA12 | 0 | 0 | 0 | 1 | 0 | 0 |
| GB9 | 0 | 0 | 0 | 0 | 0 | 0 |
| GB10 | 0 | 0 | 0 | 0 | 1 | 0 |
| GB11 | 0 | 0 | 0 | 0 | 0 | 0 |
| GB12 | 0 | 1 | 0 | 0 | 0 | 0 |
| GC9 | 0 | 0 | 0 | 0 | 0 | 0 |
| GC10 | 0 | 0 | 1 | 0 | 0 | 0 |
| GC11 | 0 | 0 | 0 | 0 | 0 | 0 |
| GC12 | 0 | 0 | 0 | 0 | 0 | 1 |

Considering the circuit components now of decoder 25, if gate GA1 has a "1" output indicative of a "0" level of waveform $P_A$, gate GA5 is closed. Conversely, when gate GA1 has a "1" level output, gate GA2 has a "0" output and gate GA6 may be opened, dependent upon other conditions. It will thus be seen that gates GA5 and GA6 will not have an output "1" at the same time. However, when both gates GA5 and GA6 are closed then memory MA1 is in a state which agrees with the level of waveform $P_A$. One of gates GA5 or GA6 has a "1" output when waveform $P_A$ changes from one voltage level to the other and that gate will maintain a "1" output until memory MA1 is updated to agree with a subsequent change in the voltage of waveform $P_A$. If one of the lines to gates GA5 or GA6 from corresponding decoders 26 and 27 applies a "1" input to gate GA5 or GA6, gate GA5 or GA6 will be closed to prevent production of an output pulse at one of gates GA9–GA12 during generation of an output pulse at decoder 26 or 27.

In this manner all of the feedback pulse outputs of decoders 25, 26 and 27 are discrete and occur during spaced apart intervals of time, at a maximum rate of one pulse per clock cycle, in the illustrated embodiment.

Memory MA1 thus holds information indicative of the voltage level of waveform $P_A$ and is updated by being set or reset by the output of one of gates GA9–GA12. One of these gates furnishes an output pulse. Generally speaking, the memory MA1 is set by a "1" input signal to the left side thereof when gate GA1 has a "1" output. The condition of memory MA1 is sensed by amplifiers GA3 and GA4 which supply this intelligence to the other decoders, as will hereinafter be made apparent.

Gates GA5 and GA6 sense the outputs of both memory MA1 and the voltage level of waveform $P_A$. One of gates GA5 and GA6 will have a "1" level output when the voltage level of waveform $P_A$ changes and will stay in such condition until memory MA1 is set or reset by one of gates GA9 to GA12 to agree with the voltage level of waveform $P_A$.

Memories MA2 and MA3 are set each clock cycle by clock pulse C3, but will be reset by one of gates GA7 or GA8 at clock pulse C4 unless the voltage level of waveform $P_A$ has changed. Memories MA2 and MA3 will inhibit the production of an output pulse from gates GA9–GA12 at clock pulse C2 if reset at the previous clock pulse C4 by providing a "1" input signal to gates GA9–GA12.

Gates GA9 and GA11 are arranged to provide pulse outputs indicative of direction II of travel of disc 20. Gates GA10 and GA12 are arranged to provide pulse outputs indicative of direction I of travel of disc 20. The occurrence of output pulses at gates GA9–GA12 is dependent on the level of waveforms $P_B$ and $P_C$ which indicate through their voltage level relationship the direction of movement of disc 20. Gates GB3, GB4, GC3 and/or GC4 will selectively open gates GA9–GA12. In a similar manner, gates GA3 and GA4 supply signals to decoders 26 and 27.

It may be noted that decoder 25 will yield an output pulse whenever one of gates GA5 or GA6 has a "1" output. However, these gates GA5 and GA6 may be held closed by inhibiting signals from corresponding gates in decoders 26 and 27. Gates GA5 and GA6 will be inhibited if decoders 26 or 27 are still working on a voltage level change of waveforms $P_B$ or $P_C$.

In one form of the invention a fault or illegal condition in each quantizer may be determined by looking at the condition of the memories MA1, MB1 and MC1 in decoders 25, 26 and 27. As seen in FIG. 5 sensing lines SA, RA, SB, RB, SC, RC are taken from each side of memories MA1 MB1 and MC1. The memories MA1, MB1 and MC1 may be regarded as the sampling circuits 28, 29 and 30 of FIG. 1.

Reference is now made to FIG. 8 which illustrates a plurality of coincidence gates G1, G2, G3, G4, G5 and G6 which comprise part of the fault detecting network 31 of FIG. 1. Each pair of gates G1, G2; G3, G4; and G5, G6 receive inputs from the memories of the decoders of one axis of a three axes servo system. Gate G1 may receive inputs from lines SA, SB and SC from memories MA1, MB1 and MC1 of FIG. 6. Similarly, gate G2 may receive inputs from lines RA, RB and RC of the same memories. If all the memories MA1, MB1 and MC1 are set all of the signals over lines SA, SB and SC to gate G1 will be "0" and gate G1 will apply a "1" level signal to a memory M1 which will set memory M1. Similarly, if all of memories MA1, MB1 and MC1 should be simultaneously reset, all of the inputs to gate G2 will be "0" and gate G2 will apply a setting signal to the left side of memory M1. In a similar manner, the memories M2 and M3 may be set by gates G3, G4 and G5, G6, respectively, for other axes of a three-axes system. If any of memories M1, M2 or M3 are set, the right side thereof will apply a "1" signal to one of inversion gates G7, G8 or G9 to establish a circuit through one of warning lamps L1, L2 or L3 indicative of the fact that an illegal or invalid condition has been sensed and an error exists in the number of feedback pulses. Simultaneously, each of memories M1, M2 or M3 will apply a "1" signal to gate G10 driving its output to "0." The "0" output is inverted to a "1" level by inversion gate G11 which applies an inhibit signal to the power means for the drive system. This inhibit signal may be utilized in various ways, for example, to shut down the hydraulic pump supplying hydraulic fluid to hydraulic motor 11 through valve 15 to prevent further movement of lead screw 12. If an electric drive system is used this signal may operate a contactor in the power line to interrupt power to the drive motor to prevent further movement of the controlled parts, such as table 13.

It will be noted that the shutdown signal from gate G11 may be amplified or utilized in any manner to effect the power shutdown. This power shutdown would be effective to shutdown movement of all axes of a multiple axes system. However, it would not interrupt the interpolation logic of a numerical control system such as shown in the co-pending application of Johann Reuteler, Ser. No. 349,215, filed Mar. 4, 1964, and assigned to the same assignee as this application. In this manner, the command pulse generating portion of the system (not shown) would not have the intelligence therein interrupted.

Then when the fault was located and corrected the parts of the system could be repositioned to continue the commanded operation.

It will be noted from FIGS. 3A and 3B that the pulse waveforms $P_A$, $B_C$ and $P_B$ have a phase or, alternatively stated, an out-of-phase relationship which is indicative of the direction of travel of table 13, and a departure of one of the pulse waveforms from this phase or out-of-phase relationship will result in all of the waveforms having an instantaneous "0" or "1" level simultaneously which will indicate a fault or illegal condition.

While the quantizer has been illustrated as one which operates at the front end thereof on photoelectric principles, the source and detectors equivalent to the light source and photocells may take the form of brushes which would bear on a commutator-like drum, interruption of magnetic lines of force, radio frequency and capacitive type pickups, and any other source and detector means which would generate the plurality of waveforms, such as $P_A$, $P_B$, and $P_C$ in a predetermined phase or out-of-phase relationship such that if any predetermined conditions such as simultaneous voltage levels occurred such condition could be detected.

It will be understood also that the invention is not limited to a system in which three pulse waveforms are generated but may utilize any number of pulse waveforms which have such relationship that all do not have a simultaneously identical condition under normal operation.

It may thus be seen that the objects of the invention set forth as well as those made apparent from the preceding description are efficiently attained. While a preferred embodiment of the invention has been set forth for purposes of disclosure, modifiiations to the disclosed embodiment of the invention as well as other embodiments thereof may occur to those skilled in the art. Accordingly, the appended claims are intended to cover all embodiments of the invention which do not depart from the spirit and scope of the invention.

What we claim is:

1. A feedback pulse generating system comprising a rotatable drive member, disc coupled to said drive member having alternate energy transmitting and nontransmitting sections, energy transmitting means disposed on one side of said disc, a plurality of energy receiving means disposed on the other side of said disc so that energy is alternately transmitted to or blocked from said receiving means as said disc is rotated, means responsive to said plurality of energy receiving means for producing a like plurality of waveforms having two fixed voltage levels, said waveforms being so related in phase that they normally never have a simultaneous similarity of voltage levels, a plurality of switching devices having two stable states, each of said switching devices being settable in a predetermined one of its states in accordance with the voltage level of said waveforms, and coincidence means for detecting if all of said switching devices are in the same state.

2. In a pulse responsive servo system including drive means and means for supplying power to said drive means to produce movement of an object coupled thereto, means responsive to movement of the object for generating a plurality of restangular waveforms having phase relationsihp such that no waveforms normally have a simultaneous equality of voltage magnitude, means for detecting a simultaneous equality of voltage magnitude in said waveforms, and means responsive to detection of a simultaneous equality for interrupting the supply of power to said drive means.

3. The invention of claim 2 wherein said waveforms are three in number and at 120 electrical degrees out of phase.

4. The invention of claim 2 wherein the phase relationship of said waveforms indicates the direction of travel of the object.

5. The invention of claim 4 wherein the duration of the rectangular pulses of said waveforms indicates the rate of travel of the object.

6. The invention of claim 5 further including means responsive to a change in voltage magnitude of one of said waveforms for geneating a signal indicative of a discrete unit of movement of said object.

References Cited

UNITED STATES PATENTS

| | | | |
|---|---|---|---|
| 2,947,929 | 8/1960 | Bower. | |
| 3,098,186 | 7/1963 | Williamson et al. | |
| 3,109,129 | 10/1963 | Putzev et al. | |
| 3,320,501 | 5/1967 | Davies. | |
| 3,111,613 | 11/1963 | Harper et al. | 318—24 |

THOMAS E. LYNCH, Primary Examiner

U.S. Cl. X.R.

91—360; 318—594, 640

PO-1050
(5/69)

UNITED STATES PATENT OFFICE
CERTIFICATE OF CORRECTION

Patent No. 3,536,979 Dated October 27, 1970

Inventor(s) Johann F. Reuteler - Robert F. Anderson

It is certified that error appears in the above-identified patent and that said Letters Patent are hereby corrected as shown below:

Column 2, line 38, after "some" insert -- means --

Claim 1, line 2, after "member," insert -- a --

SIGNED AND SEALED
MAR 9 1971

(SEAL)
Attest:

Edward M. Fletcher, Jr.
Attesting Officer

WILLIAM E. SCHUYLER, JR.
Commissioner of Patents